No. 657,467. Patented Sept. 4, 1900.
H. TANK.
FEEDER ATTACHMENT FOR THRESHING MACHINES.
(Application filed Feb. 20, 1900.)
(No Model.)
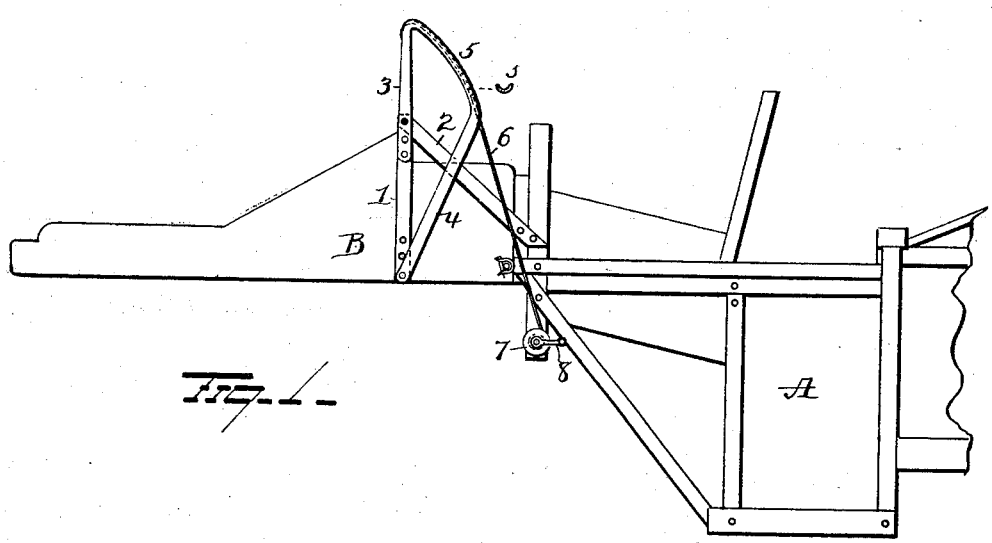
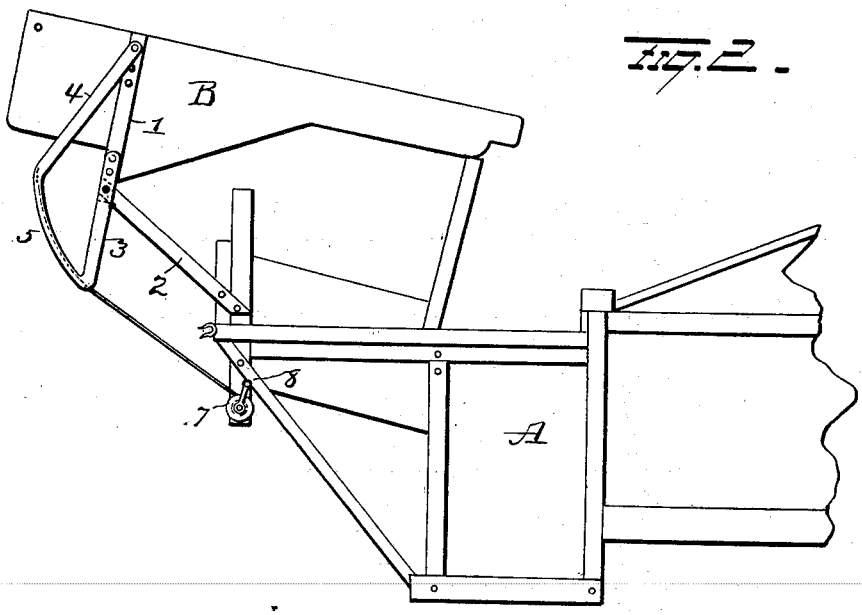
WITNESSES
INVENTOR

UNITED STATES PATENT OFFICE.

HENRY TANK, OF NEAR FREMONT, NEBRASKA.

FEEDER ATTACHMENT FOR THRESHING-MACHINES.

SPECIFICATION forming part of Letters Patent No. 657,467, dated September 4, 1900.

Application filed February 20, 1900. Serial No. 5,946. (No model.)

*To all whom it may concern:*

Be it known that I, HENRY TANK, residing near the city of Fremont, in the county of Dodge and State of Nebraska, have invented certain new and useful Improvements in Feeder Attachments for Threshing-Machines; and I do hereby declare the following to be a full, clear, and exact description of the invention, such as will enable others skilled in the art to which it appertains to make and use the same.

My invention relates to an improvement in feeder attachments for threshing-machines, and more particularly to means for folding or swinging the feeder attachment back onto the threshing-machine, the object of the invention being to provide improved means for folding the feeder attachment back onto the threshing-machine which shall be extremely simple in construction, easily operated, neat in appearance, cheap to manufacture, and strong and durable when in use.

With this object in view the invention consists in certain novel features of construction and combinations and arrangements of parts, as will be more fully hereinafter described, and pointed out in the claims.

In the accompanying drawings, Figure 1 is a view in side elevation, showing the feeder in position for work; and Fig. 2 is a similar view showing the feeder folded over on the threshing-machine.

A represents a portion of a threshing-machine, and B a feeder-frame provided at each side with an upright 1, pivotally connected at their upper ends to upwardly and rearwardly extending bars 2, secured to the threshing-machine frame A.

My improved operating mechanism comprises at each side of the feeder attachment a vertical post 3, secured to the upright 1 at its upper end and extending upward above the pivotal point thereof, another rod 4, secured near the lower end of said upright and disposed at an acute angle thereto, and a curved bar 5, connecting the upper ends of said post 3 and rod 4 and made concave in cross-section on its outer face to serve as a guide for a rope or chain 6, secured at one end to the upper end of the post 3, and the lower ends of said chains secured to a shaft or drum 7, mounted transversely in the threshing-machine frame and provided at one or both sides with a crank 8 for turning the same.

The operation of my improvements is as follows: When the feeder is in operation, the parts are in the positions shown in Fig. 1, and when it is desired to move the threshing-machine it is necessary to move the feeder upward and out of the way to permit the attachment of draft-animals or an engine to the feeder end of the threshing-machine, and in my improved construction this is done by operating the crank 8 to revolve the shaft or drum 7 and exert a forward pull on the upper end of the post 3 and owing to the curved bar 5 and rod 4 exert also a rearward pressure on the lower end of the upright 1 below its pivotal point, and as the drum 7 is rotated the ropes or chains 6 will be shortened and fold the feeder attachment over onto the threshing-machine, as clearly shown in Fig. 2.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a machine-frame and a feeder-frame pivoted at its upper edge thereto, of a post projecting upwardly from the pivotal support of the feeder-frame, a cord or chain secured to the upper end of said post and a device on the machine-frame below the plane of and approximately in line with the end of the feeder-frame for manipulating said cord or chain to invert said feeder-frame.

2. The combination with a machine-frame and a feeder-frame, said feeder-frame pivoted at its upper edge near one end to one end of the feeder-frame, of a post carried by the feeder-frame and projecting upwardly above the pivotal support thereof, a segment projecting from said post toward the machine-frame, a flexible device mounted on said segment and secured at the upper end thereof and means located on the machine-frame below and approximately in line with the pivoted end of the feeder-frame for manipulating said flexible device to cause the feeder to be placed upon the machine-frame or to remove it therefrom.

3. The combination with a threshing-machine frame and a feeder attachment pivotally connected therewith, of a post secured to the feeder attachment and projecting above the pivotal point thereof, a curved bar secured to said post, a rod connecting the free end of said curved bar with the feeder attachment below the pivotal point thereof, a drum supported by the threshing-machine frame in a plane below that of the pivotal point of the feeder attachment, means for operating said drum, and a chain or rope connecting the upper end of the post and drum and disposed along the upper face of the curved bar.

In testimony whereof I have signed this specification in the presence of two subscribing witnesses.

HENRY TANK.

Witnesses:
FRANK DOLEZAL,
M. H. HUNTER.